DETECTION CIRCUIT UTILIZING OPPOSITE CONDUCTIVITY TRANSISTORS TO DETECT CHARGE ON A CAPACITOR

Filed Oct. 19, 1961 2 Sheets-Sheet 1

INVENTOR.
JACK E. STONE
BY

INVENTOR.
JACK E. STONE
BY Edward M. Farrell 3,191,058

DETECTION CIRCUIT UTILIZING OPPOSITE CONDUCTIVITY TRANSISTORS TO DETECT CHARGE ON A CAPACITOR

Jack Stone, Ambler, Pa., assignor to Sperry Rand Corporation, New York, N.Y., a corporation of Delaware Filed Oct. 19, 1961, Ser. No. 146,094
4 Claims. (Cl. 307—88.5)

This invention relates to a detection circuit, and more particularly to a circuit for detecting differences in pulse widths between two consecutive electrical signals in a signal train.

In many electrical systems, such as a computer system, electrical signals having square or rectangular shaped characteristics are often involved. It is often desirable in such systems to detect variations in the widths of two such consecutive signals.

An example of a use of such a circuit may be found in a phase modulation computer system. In such systems, binary information signals are recorded on a recording medium, such as a magnetic drum or tape. Such binary signals, having one of two different characteristics, may represent a "1" or a "0." A signal representing a "1," for example, may be represented by an alternating signal having a first form during the first half of its digit period and a second form during the second half of its digit period. Likewise, a "0" may be represented by a signal which is in the second form during the first half of its digit period and in the first form during the second half of its digit period. Both types of signals may be considered as passing through zero in going from one level to another at the middle of their digit periods.

After the recorded signals are read from the recording medium, they generally are passed through various electrical circuits and are converted to a form of square wave or rectangular shaped signals. These square wave signals are then used to produce information pulse signals representing either a "1" or a "0." In generating information pulse signals, spurious or non-significant pulse signals are produced whenever two consecutive information signals of a similar nature are read from the recording medium. Various additional means must generally be employed to eliminate these spurious signals before passing on the information signals to subsequent utilization circuits.

It is an object of this invention to provide a circuit for detecting non-symmetry between two consecutive signals in a signal train.

It is a further object of this invention to provide an improved circuit for detecting the character of two consecutive binary signals.

It is a further object of this invention to provide an improved circuit for eliminating spurious pulse signals from a wave train of information pulses in a phase modulation reading circuit of a computer system.

In accordance with the present invention, a circuit is provided for detecting non-symmetry between two consecutive square wave signals. The square wave signals are applied to an integrator circuit which charges during the first half cycle of each signal and discharges during the second half cycle. The rate of charge and discharge of the integrator circuit is maintained relatively constant. If the nature of two consecutive signals are the same, the integrator circuit will not be charged at the end of the digit period or cycle. If the two consecutive square wave signals are different, the integrator circuit retains an electrical charge. Means for detecting the charge at the integrator circuit is provided. Various utilization circuits may be actuated in accordance with the state of charge at the integrator circuit.

Other objects and advantages of the present invention will be apparent and suggest themselves to those skilled in the art, from a reading of the following specification and claims in which:

Figure 1:
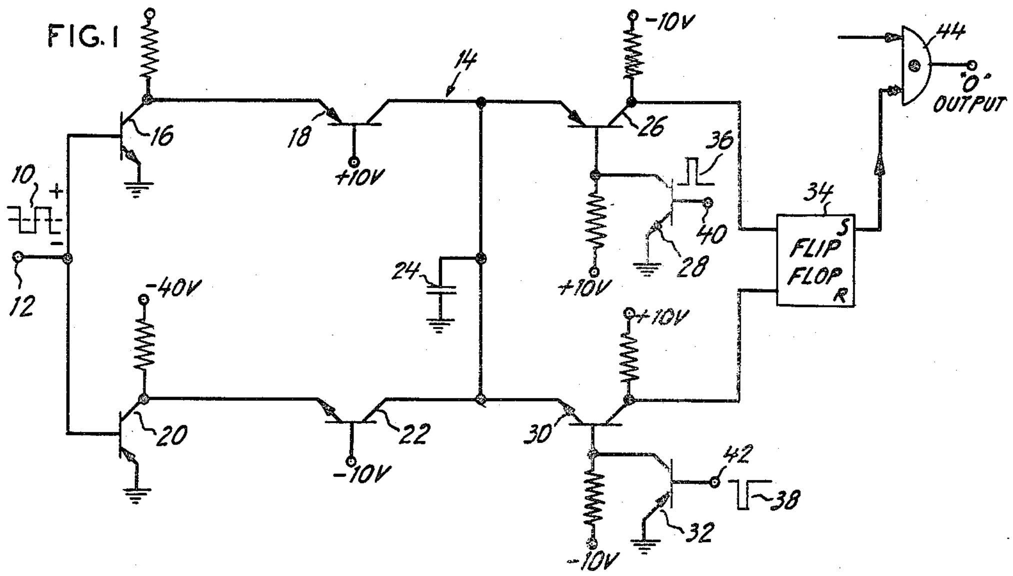
FIGURE 1 is a schematic diagram of a detection circuit, in accordance with the present invention.

Referring particularly to FIGURE 1, a rectangular signal illustrated by a waveform 10 is applied to an input terminal 12 of a detection circuit 14. A first pair of transistors 16 and 18 and a second pair of transistors 20 and 22 provide means for coupling the input signal 10 to an integrator illustrated as being a capacitor 24. The transistors 16 and 22 are illustrated as being of the NPN types, while the transistors 18 and 20 are of the PNP types. As will be described, the capacitor 24 will assume a negative potential charge or a positive potential charge whenever the positive portion of the input signal 10 is not symmetrical with the subsequent negative portion of the cycle, i.e. they are not of the same duration or width. For purposes of explanation, the upper portion of the waveform 10 will be considered positive with respect to a point of reference potential zero. Likewise, the lower portion of the waveform 10 will be considered negative. If the input signal 10 includes two consecutive symmetrical portions of equal width, the capacitor 24 will assume a zero charge.

A pair of transistors 26 and 28 and a pair of transistors 30 and 32 are provided for detecting the state of charge of the capacitor 24. The transistors 26 and 32 are of the PNP types while the transistors 28 and 30 are of the NPN types. Dependent upon the state of charge of the capacitor 24, i.e. whether it assumes a negative or positive charge, an output signal will be developed the collector electrode of either the transistor 26 or 30. A signal developed at the collector of either transistor 26 or 30 may be applied to actuate a utilization circuit, such as a bistable or flip-flop circuit 34.

Assume first that the input signal 10 is in the negative state, i.e. at its lower level. At this point, the transistors 16, 18, 20 and 22 are biased to produce certain operating conditions. The transistor 16 is in an "off" or non-conducting state. The transistor 18 is in an "on" or conducting state. During the time that the transistor 18 is conducting, a relatively constant current charges the capacitor 24. When the input signal 10 is negative, the transistor 20 is "on" or in a saturated state and the transistor 22 is "off" or in a non-conducting state.

When the input signal 10 goes positive from a negative state, the transistors 16, 18, 20 and 22 are switched to their opposite operating states. The transistors 16 and 22 are switched from their "off" states to "on" states and the transistor 18 and 20 are switched from their "on" state to "off" states. Under these operating conditions, a constant current linearly discharges the capacitor 24. If the signal cycle of the signal 10 is symmetrical, i.e. the input signal 10 includes two consecutive signal periods of opposite polarities and of the same duration or widths, the voltage at the capacitor 24 at the end of the two consecutive periods will be zero. If the signal 10 does not include two consecutive periods of the same duration, i.e. they are not symmetrical, the capacitor 24 will assume a positive or negative charge, depending on which of the two periods is longer in duration, When the time intervals of two consecutive signal periods are the same, the capacitor 24 will charge during the first period and discharge during the second period. Since the time intervals of both periods are the same, the total charge on the capacitor 24 will be the same at the end of the two periods as it was at the start of the two periods. This charge will generally be zero voltage.

When the two consecutive time periods of the signal are of different durations, a charge will be developed at the capacitor 24. The capacitor 24 will be discharged during the sampling intervals when signals 36 and 38 are applied to the bases of the transistors 28 and 32, respectively. The discharge will take place through transistors 26 or 30 depending on whether C has a plus or a minus charge. Pulses are developed at the collectors of the transistors 26 or 30 during the sampling intervals and are applied ot the flip-flop circuit 34 when the capacitor 24 is in a state of charge.

Consider now the sampling circuit which may be used with the present invention. A pair of transistors 28 and 32 are normally "off" or in their non-conducting states. The transistor 28 may be of the NPN type while the transistor 32 may be of the PNP type. When the sampling pulse signals 36 and 38 are applied to the input terminals 40 and 42, respectively, the transistors 28 and 32 are switched "on" to their saturated conducting state. This action causes the base electrodes of transistors 26 and 30 to be very close to ground potential. The transistor 26 is of the PNP type while the transistor 30 is of the NPN type. If the voltage at the capacitor 24 is positive during the time interval of the pulse signals 36 and 38, which may be regarded as sampling pulses, the transistor 26 is forward biased to cause the transistor 26 to become conductive. When the transistor 26 is conductive, the capacitor 24 discharges through the transistor 26 to produce a pulse signal at the collector electrode of the transistor 26. The pulse signal at the collector of the transistor 26 may be applied to set the flip-flop 34. The flip-flop 34, in turn, may control the operation of an AND gate circuit 44. In the previous discussion, the transistor 26 may be considered as a form of AND gate circuit, which produces an output signal when two input signals are present. One input signal alone is not sufficient to produce an output signal.

If the voltage charge at the capacitor 24 is negative in polarity at the time of the sampling pulses 36 and 38, a pulse signal is produced at the collector of the transistor 30 and the capacitor 24 discharges through the transistor 30. This pulse signal may also be applied to the flip-flop 34 to switch or reset the flip-flop. The gate circuit 44, being connected to the set output of the flip-flop 44, will be opened or closed depending upon the operating state of the flip-flop 34, which in turn is dependent upon the last state of charge of the capacitor 24.

The particular circuit disclosed embodying the present invention may be used in various applications. For example, the circuit disclosed may be used in connection with servo systems. In this application the state of charge of the capacitor 24 may be employed to vary the duration of the cycle of the input signal 10 to provide a symmetrical signal. While it is realized that the circuit disclosed may have wide application in systems where symmetrical and non-symmetrical signals must be detected to perform certain functions, the invention has found particular application in a phase modulation reading circuit of a computer systems. Such a system will be generally considered to particularly point out one instance in which the present invention has proven to be useful.

Figure 2:
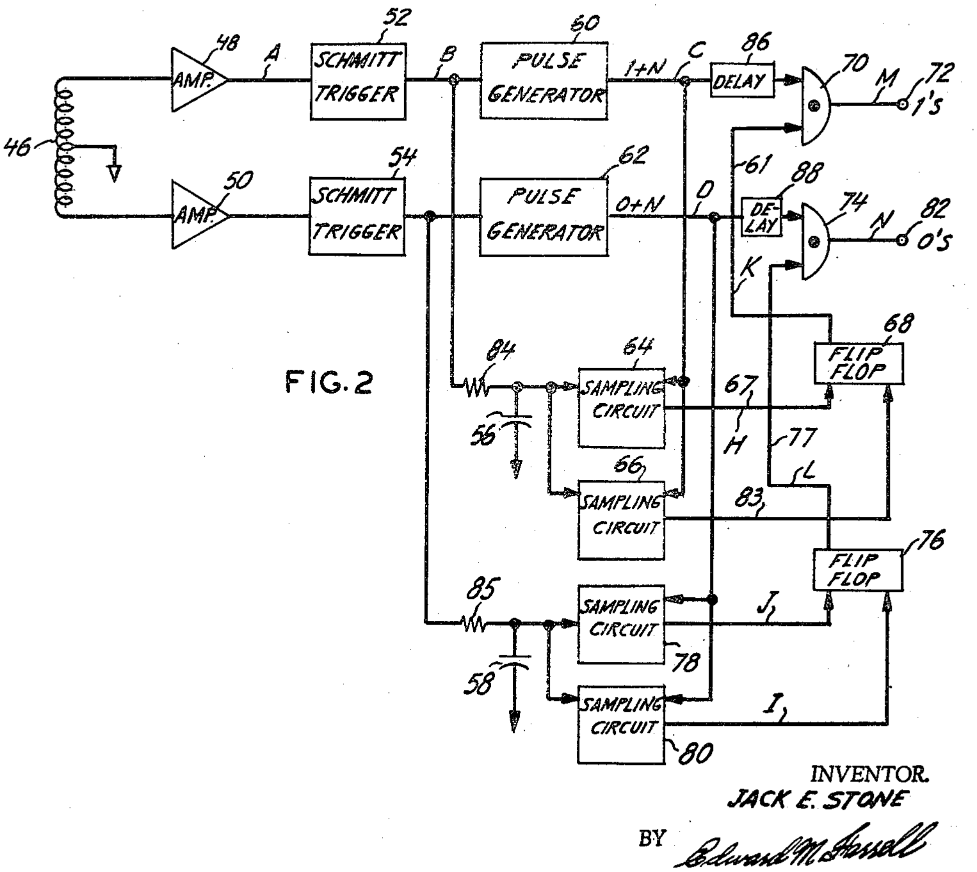
FIGURE 2 is a block diagram illustrating a reading circuit in a phase modulation system, in which the present invention may be employed.
Figure 3:
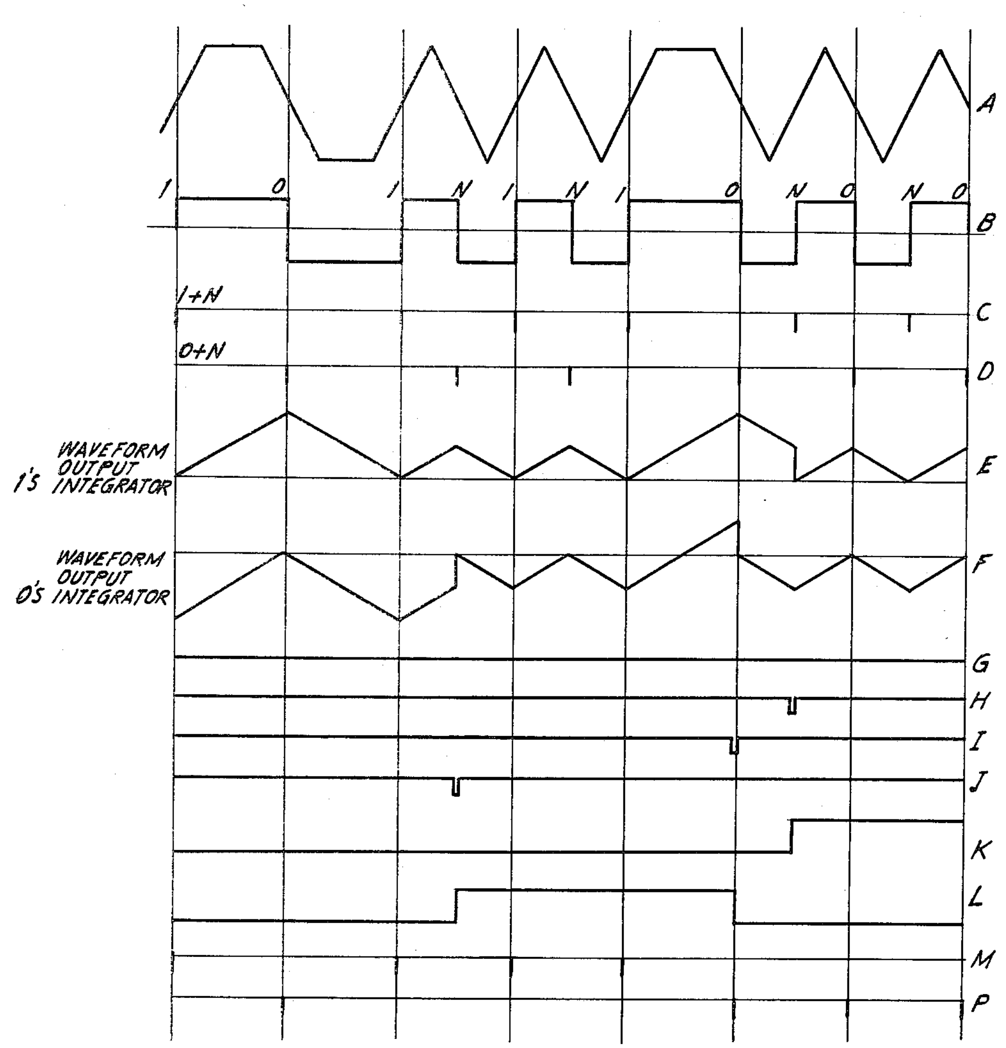
FIGURE 3 is a series of waveforms shown to illustrate the operation of the reading circuit of a phase modulation system such as illustrated of FIGURE 2.

Referring particularly to FIGURE 2, a reading arrangement for a phase modulation reading system is illustrated. A coil 46 may be associated with a reading head of a tape or drum storage device, for example. During a reading operation, electrical signals are produced in the coil 46 and applied to a pair of amplifiers 48 and 50. These signals may roughly correspond to the signals represented by the waveform A of FIGURE 3. The output signals from the amplifiers 48 and 50 are applied to a pair of Schmitt trigger circuits 52 and 54, respectively. The output from the Schmitt trigger circuits are illustrated by a waveform B.

The output signals from the Schmitt trigger circuits 54 and 52 are applied to capacitors 56 and 58, respectively. The output signals from the Schmitt trigger circuits 52 and 54 are also applied to a pair of pulse generator circuits 60 and 62, respectively, to produce a series of pulse signals. The output pulse signals from the pulse generator 60 is represented by the waveform C. The output pulse signals from pulse generator circuit 62 are represented by the waveform D.

The output electrical signals from the Schmitt trigger circuits 52 and 54 cause a charging and discharging of the capacitors 56 and 58, respectively, in a manner similar to that described in connection with FIGURE 1. The output pulse signals from the pulse generator 60 are applied to sampling circuits 64 and 66. Likewise, the output pulse signals from the pulse generator 52 are applied to the sampling circuits 78 and 80.

With the signals represented by the wavetrain B being applied from the Schmitt trigger circuit 52, the capacitor 56 charges and discharges at a rate illustrated by the waveform E. Likewise, the output signal from the Schmitt trigger circuit 54 causes the capacitor 58 to charge and discharge at a rate illustrated by the waveform F.

The output pulse signals from a pulse generator 60, are applied to the sampling circuits 64 and 66 in order to detect the state of charge of the capacitor 56. If the state of charge of capacitor 56 is zero, no output signal will be developed at line 67 or 83 to affect the operating state of a flip-flop circuit 68. On the other hand, if the state of charge of the capacitor 56 is other than zero, a pulse signal will be developed at the line 67 or 83 and applied to the flip-flop circuit 68. For example, if a pulse signal is produced by the pulse generator 60 when the voltage charge at the capacitor 56 is positive, a pulse signal, illustrated by the waveform H will be applied to the flip-flop circuit 68. The output signal at the line 61 of the flip-flop circuit 68 is applied to a gate circuit 70. The output voltage from the flip-flop circuit 68 is represented by the waveform K. When the output voltage from the flip-flop circuit 68 is at a lower or more negative level, the gate circuit 70 will be open to permit any pulses appearing from the pulse generator circuit 60 to pass through the gate 70 to an output terminal 72. When the output voltage from the flip-flop circuit 68 rises to a higher level or more positive, the gate circuit 70 will be closed thereby inhibiting the passage of any pulses from the pulse generator 60 to the output terminal 72. A short delay circuit 86 is necessary to inhibit the first non-significant pulse after a change of state of flip-flop 68 and to permit passage of the first "1" information pulse.

Amplitude threshold circuits (not illustrated) may be necessary in some practical systems at the output circuits of the sampling circuits. These threshold circuits will prevent the flip-flops 68 and 76 from being triggered when a relatively small plus or minus charge is accumulated by the integrator at the capacitors 56 or 58 as a result of undesired non-symmetry. Such non-symmetry may be referred to as "jittery," Such threshold circuits are well known to those skilled in the art. Since they are not specifically directed to the invention, they are not illustrated for purposes of clarity.

The functions of the sampling circuits are two-fold. The first function is to produce an output pulse when the integrator indicates that the input signal has changed phase by 180 degrees. The second function is to insure that the integration of each cycle starts from the same reference level, i.e. independent of previous history.

In the system illustrated, it is desired to detect only phase changes of 180 degrees. However, the system illustrated could be used in other applications, to detect any phase change and produce a pulse in which the amplitude of the pulse is proportional to the amount of phase change. The latter arrangement, of course, would not require the use of threshold circuits previously discussed.

Each time that the capacitor 56 is charged to some voltage level, it is discharged to zero volts during the sampling interval. This type of operation was described in connection with FIGURE 1. Pulses are developed to control flip-flop circuits 68 and 76 during the discharge of the capacitor 56 and 58 caused by the sampling pulses.

A second gating circuit 74 is controlled by the operating state of a flip-flop 76. The operating state of the flip-flop 76, having an output waveform such as illustrated at point L, at the line 77. Output pulse signals from the pulse generator 62, illustrated by the waveform D, are applied to a pair of sampling circuits 78 and 80 to detect the state of charge at the capacitor 58. If the state of charge at the capacitor 58, illustrated by the waveform F, is negative, a negative pulse, represented by the waveform J, is applied from the sampling circuit 78 to the flip-flop 76. Under these conditions, the operating state of the flip-flop 76 is switched to close the gate circuit 74. This prevents any pulses from the pulse generator 62 from passing through the gate circuit 74 to the output terminal 82. A delay circuit 88 is provided between the pulse generator circuit 62 and the gate circuit 74.

A positive charge on capacitor 58 is detected by sampling circuit 80 and a pulse is developed at a point I to reset or switch the operating state of the flip-flop 76 to thereby open the gate circuit 74. Opening of the gate circuit 74 permits pulse signals from the pulse generator 62 to be applied to the output terminal 82.

It is noted that the signal train illustrated by the waveform C includes pulses which represent true information or "1"s, as well as including pulses which do not represent the information. The latter type pulses may be classified as spurious or non-significant pulses. The signal train waveform M, representing the pulse signals passing through the gate 70 to the output terminal 72, on the other hand, only include pulses which represent true "1" bits of information and do not include non-significant or spurious pulses. The reason for this is that the gate 70 is open only during the time that the significant pulses are developed by the pulse generator 60 and is closed during the time interval involving the non-significant pulses.

Likewise, it is seen that the output pulses from the pulse generator 62, illustrated by the waveform D, include information pulses representing "0" information as well as non-significant pulses. The waveform P, however, includes only true "0" information pulses, the gate circuit 74 being open only during the proper time intervals in a manner described.

In relating the circuit of the present invention, illustrated by FIGURE 1, to the system illustrated in FIGURE 2, the Schmitt trigger circuit 52 of FIGURE 2 may be considered as the circuits comprising transistors 16 and 20. Resistor 84 is the equivalent of the current source transistors 18 and 22. The sampling circuits 64 may be considered as including the transistors 26 and 28. The sampling circuit 66 may be considered as including transistors 30 and 32. Capacitor 56 to FIGURE 2 may be considered the equivalent of the capacitor 24 of FIGURE 1. The flip-flop circuit 34 of FIGURE 1 may be similar to the flip-flop circuit 68 of FIGURE 2. The gate circuit 44 of FIGURE 1 may be similar to gate 70 of FIGURE 2.

It is noted that the circuit illustrated by FIGURE 1 would be used in connection with reading only one type of information, for example, "1" information signals. For a complete reading system involving reading both "0"s and "1"s, the circuit of FIGURE 1 would be duplicated to produce the system illustrated by FIGURE 2.

What is claimed is:

1. In combination with a source of input signals having first and second portions of a positive or negative level with respect to a point of reference potential, said positive and negative levels being of substantially the same voltage amplitudes with respect to said point of reference potential, means for detecting a difference in the time duration of said first and second portions of said signals comprising a capacitive circuit capable of assuming a positive or negative charge with respect to said point of reference potential, means for generating pulse signals each time said signals change from one level to the other, a transistor circuit for applying said input signals to said capactive circuit to charge said capacitive circuit during said first portion of said input signal and to discharge said capacitive circuit during said second portion of said input signal, the rate of said charge and said discharge being substantially the same, said capacitive circuit retaining a positive or negative charge when the time durations of said first and second portions of said input signal are different, said capacitive circuit retaining a zero charge when the time durations of said first and second portions of said input signals are substantially the same, a detector circuit and means for applying said pulse signals to said detector circuit to detect the state of charge of said capacitive circuit.

2. In combination with a source of input signals having first and second portions of a positive or negative voltage level with respect to a point of reference potential, said positive and negative levels being of substantially the same voltage amplitudes with respect to said point of reference potential, means for detecting a difference in the time duration of said first and second portions of said signals comprising a capacitive circuit capable of assuming a positive or negative charge with respect to said point of reference potential, means for generating pulse signals each time said input signals change from one level to the other, a circuit for applying said input signals to said capacitive circuit to charge said capacitive circuit during said first portion of said input signal and to discharge said capacitive circuit during said second portion of said input signal, the rate of said charge and said discharge being substantially the same, said capacitive circuit retaining a positive or negative charge when the time durations of said first and second portions of said input signal are different, said capacitive circuit retaining a zero charge when the time durations of said first and second portions of said input signals are substantially the same, a transistor circuit normally biased to cut off, means for applying said pulse signals to said transistor circuit, means for applying a voltage at said capacitive circuit to said transistor circuit, said transistor circuit becoming conductive when a voltage signal from said capacitive circuit and a pulse signal are simultaneously applied thereto.

3. The invention as set forth in claim 2 wherein said transistor circuit includes a pair of transistors, with one transistor responsive to become conductive for a positive voltage charge at said capacitive circuit and the other transistor being responsive to become conductive for a negative voltage charge at said capacitive circuit.

4. The invention as set forth in claim 3 wherein said pair of transistors each comprise emitter, collector and base electrodes, with said pulse signal being applied to the base electrode, the voltage charge from said capacitive circuit being applied to said emitter electrode, an output circuit, and means for applying an output signal from said collector electrode to said output circuit.

References Cited by the Examiner

UNITED STATES PATENTS

| | | | |
|---|---|---|---|
| 3,064,144 | 11/62 | Hardy | 307—88.5 |
| 3,140,406 | 7/64 | Thompson | 307—88.5 |

OTHER REFERENCES

Pub. I: IBM Disclosure Bulletin, vol. 3, No. 10, March 1961, page 83.

ARTHUR GAUSS, *Primary Examiner.*

JOHN W. HUCKERT, *Examiner.*